Figure 1:
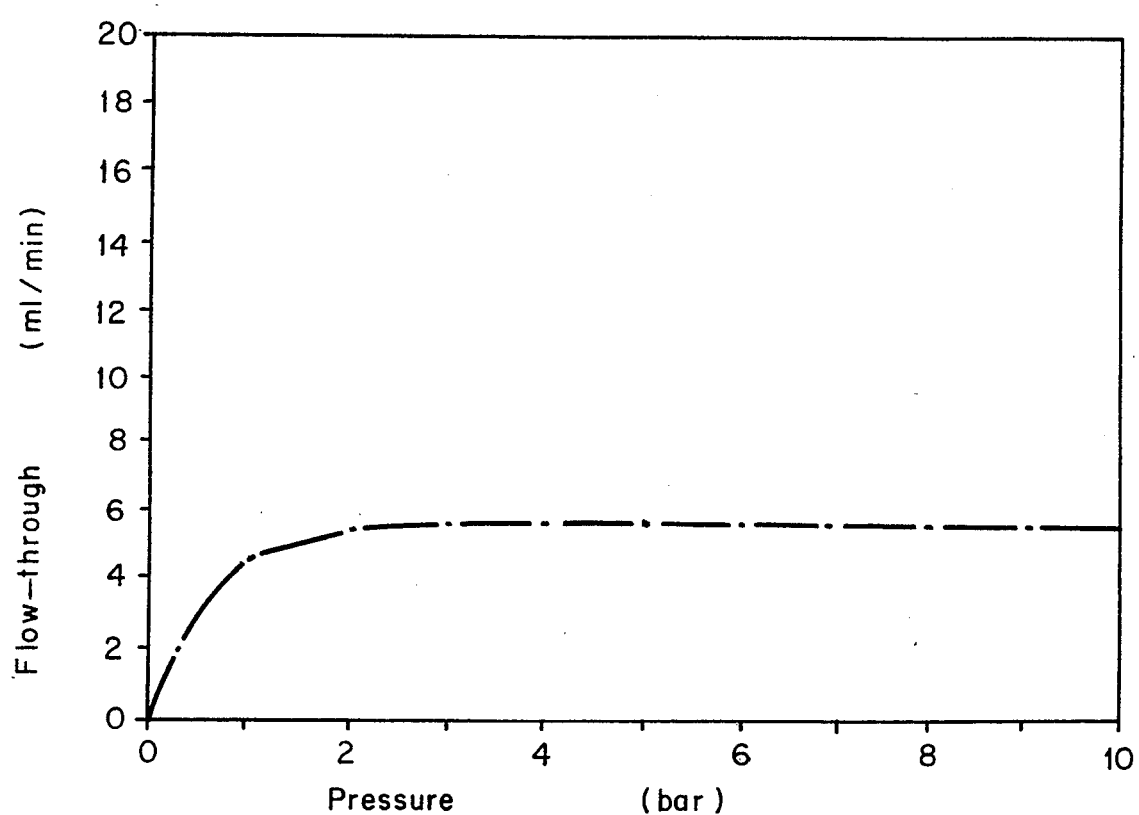
Figure 2:
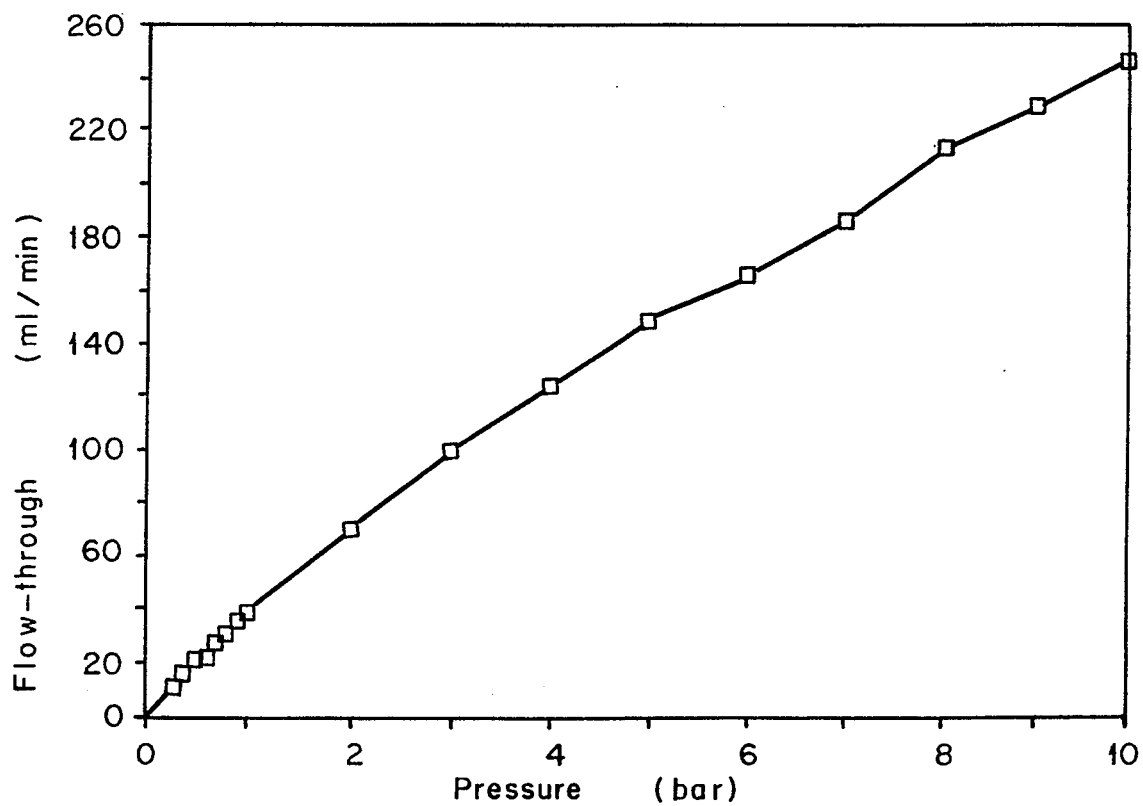

United States Patent [19]

Nussstein et al.

[11] Patent Number: 5,357,012
[45] Date of Patent: Oct. 18, 1994

[54] WATER-INSOLUBLE CYCLODEXTRIN POLYMERS AND PROCESSES FOR THEIR PREPARATION

[75] Inventors: Peter Nussstein; Guenther Staudinger, both of Munich; Franz-Heinrich Kreuzer, Martinsried; Wolfgang Schmitt-Sody, Wolfratshausen, all of Fed. Rep. of Germany

[73] Assignee: Consortium für elektrochemische industrie GmbH, Munich, Fed. Rep. of Germany

[21] Appl. No.: 927,434

[22] PCT Filed: Mar. 22, 1991

[86] PCT No.: PCT/EP91/00562

§ 371 Date: Sep. 25, 1992

§ 102(e) Date: Sep. 25, 1992

[87] PCT Pub. No.: WO91/14710

PCT Pub. Date: Oct. 3, 1991

[30] Foreign Application Priority Data

Mar. 27, 1990 [DE] Fed. Rep. of Germany ....... 4009825

[51] Int. Cl.⁵ ............................................. C08F 24/00
[52] U.S. Cl. ................... 526/238.2; 536/103; 526/207
[58] Field of Search ............ 526/238.2, 238.23, 207; 536/103

[56] References Cited

U.S. PATENT DOCUMENTS

| | | | |
|---|---|---|---|
| 2,492,203 | 12/1949 | Treadway | 526/103 X |
| 3,340,239 | 9/1967 | Schweiger | 526/266 |
| 3,453,260 | 3/1967 | Parmerter et al. | 536/103 |
| 3,565,887 | 5/1968 | Parmerter et al. | 536/103 |
| 4,094,833 | 11/1976 | Johansson et al. | 526/238.22 |
| 4,539,399 | 7/1984 | Armstrong | 536/103 |
| 4,833,202 | 5/1989 | Dunn, Jr. | 525/54.2 |

FOREIGN PATENT DOCUMENTS

| | | |
|---|---|---|
| 0244288 | 11/1987 | European Pat. Off. |
| 0309404 | 9/1988 | European Pat. Off. |
| 0464795A3 | 1/1992 | European Pat. Off. |
| 4028836A1 | 3/1992 | Fed. Rep. of Germany |
| 2334691 | 12/1976 | France |
| 2927733 | 7/1979 | France |
| 2255336A | 4/1992 | United Kingdom |

OTHER PUBLICATIONS

J. Szejtli, Cyclodextrin Technology (Kluwer Academic Publishers), 1988, p. 59.
A. Harada et al., Macromolecules 9 (1976), 701.
C. A. 110: 175437q, "Process for fixation of cyclodextrin in crosslinked polymers".
J. Solms et al. Helv. Chim. Acta 48(1965), 1225, "Harze mit Einschlusshohlräumen von Cyclodextrin-Struktur".
P. E. Shaw et al., J. Food Sci. 48(1983), 646, "Debittering Citrus Juices with beta-Cyclodextrin Polymer".
A. Ujhazy et al., Gordian 89(3) (1989), 43, "Removal of Naringin from Aqueous Solution with Cyclodextrin Bead Polymer".

Primary Examiner—Mark Nagumo
Attorney, Agent, or Firm—Collard & Roe

[57] ABSTRACT

A hydrophilic, water-dilatable cyclodextrin polymerizate has a high cyclodextrin content which possesses good mechanical properties. The cyclodextrin pearl polymerizates are produced by radical, inversion suspension polymerization of cyclodextrin derivatives carrying methacrylate groups or their copolymerization with suitable comonomers such as hydroxyethylacrylate or hydroxymethylacrylate. Suitable cyclodextrin derivatives can be produced by reacting cyclodextrins or hydroxyalkyl cyclodextrins with methacrylic anhydride or with glycidyl methacrylate. The cyclodextrin polymerizates produced in this manner have mechanical properties appreciably superior to those of known, comparable cyclodextrin polymers.

4 Claims, 1 Drawing Sheet

WATER-INSOLUBLE CYCLODEXTRIN POLYMERS AND PROCESSES FOR THEIR PREPARATION

The invention relates to water-insoluble cyclodextrin bead polymers, which are formed by free radical polymerization of cyclodextrin derivatives containing polymerizable groups, and to processes for their preparation.

Cyclodextrins are cyclic, non-reducing oligosaccharides, consisting of α-D-glucose units which have exclusively 1,4-glucoside links. Currently α-, β- and γ-cyclodextrin, which are built up from 6, 7 and 8 anhydroglucose units respectively, are available in relatively large amounts. The most interesting property of the cyclodextrins is their ability to form inclusion complexes (host/guest compounds). In these compounds hydrophobic guest molecules of suitable size are enclosed in the cyclodextrin cavity and reversibly bonded by hydrophobic interactions, van der Waals forces and, in some cases, also hydrogen bridge bonds. By far the majority of applications of cyclodextrins are also based on the formation of these inclusion complexes. Thus, for example, they are suitable for chromatographic separations, as catalysts, as stabilizers, for solubilization or for converting liquid substances into the solid aggregate state.

Since, because of their chiral C atoms, cyclodextrins are able to act as enantion-selective receptors, chromatographic separations of suitable enantiomers are also possible with the participation of cyclodextrin inclusion compounds. As a result of these selective receptor characteristics, the stereoselectivity of chemical reactions can also be increased by cyclodextrins. However, if dissolved cyclodextrin is used as separating agent or extractant or as a catalyst, the separation of the inclusion compound from the system and the liberation of the included compound from the cyclodextrin are difficult. Therefore, an immobilization of cyclodextrins with the production of their inclusion capacity is advantageous. Immobilized cyclodextrins can be used, for example, as the stationary phase in separation processes in chromatography. Hitherto, an immobilization of cyclodextrins has been attempted in very diverse ways. However, all previously described immobilization methods have defects.

Insoluble (immobilized) cyclodextrins and their use in separation processes have already been described by Solms and Egli (Helv. Chim. Acta 48, 1225 (1965)). In German Patent Specification DE 29 27 733, J. Szejtli et al. describe cyclodextrin-polyvinyl alcohol polymers and a process for their preparation. Compared with the cyclodextrin gels known hitherto, these have somewhat better mechanical properties.

In J. Food Sci. 48, 646, (1983), P. E. Shaw and C. W. Wilson describe the use of such cyclodextrin polymers for separating bitter substances from citrus juices.

In Gordian 89 (3), 43 (1989) A. Ujhazy and J. Szejtli also describe the separation of a bitter substance (naringin) from aqueous solutions with the aid of a cyclodextrin bead polymer.

In the case of the already known cyclodextrin gels which have been mentioned, the immobilization of the cyclodextrins is achieved by bifunctional crosslinking agent units. A three-dimensional, hydrophilic cyclodextrin lattice which is swellable in water is formed. Material in bead form can be obtained by means of a method relating to inverse suspension polymerization. The crosslinking agent units used are preferably epichlorohydrin or diepoxy compounds. However, all the cyclodextrin polymers prepared in this way which have been described hitherto are unsuitable for filling columns which are operated under a pressure distinctly higher which are operated under a pressure distinctly higher than atmospheric pressure, since even under a pressure of 3 bar there is already a deformation of the packing such that the flow rates through a filled column are low. Moreover, when the pressure is increased, the flow-through rates do not increase substantially because of the softness of the material. High flow-through rates are, however, desirable on economic grounds. Furthermore, an increase in the separation efficiency can also be achieved by increasing the pressure for a given column packing material.

In order to obtain a cyclodextrin-containing material which is suitable as column packing material for higher pressures, another process has also been proposed, in which, in contrast to the proposal already mentioned, cyclodextrin molecules are bonded directly or via a spacer to a pressure-stable parent polymer in bead form.

In U.S. Pat. No. 4,539,399 D. W. Armstrong describes the fixing of cyclodextrins on silica gel as support material with the aid of linking reagents such as, for example, 3-glycidoxypropyltrimethoxysilane. The decisive disadvantage of these materials is their low cyclodextrin content. Thus, although these products are suitable for analytical purposes, they are, however, completely unsuitable for preparative use because of their low capacity.

In Japanese Patent Application 63 314 201 (CA 110 (1989): 175 437 q) the immobilization of cyclodextrins by fixing on a copolymer which consists of a glycidyl monovinyl ester (for example glycidyl methacrylate) or a glycidyl monovinyl ether (for example allyl glycidyl ether) and ethylene glycol dimethacrylate is described. In this procedure the fixing of the cyclodextrins is effected by treatment of the copolymer with HCl, during which treatment the epoxide rings of the glycidyl radical are opened, and subsequent reaction of this intermediate with a basic cyclodextrin solution. However, materials prepared in this way have several disadvantages. In addition to their low cyclodextrin content, the immobilization yield with respect to β-cyclodextrin is also low. In addition, the high content of relatively hydrophobic carrier polymer is a decisive disadvantage. This high proportion of hydrophobic sites outside the cyclodextrin cavities leads to unselective adsorptions of hydrophobic substances from the solution to be treated. The result of this is that, on desorption or elution these, unselectively adsorbed substances are mixed with those which were selectively bound to cyclodextrin units.

In "Cyclodextrin Technology" (Kluwer Academic Publishers) 1988, p. 59 et seq., J. Szejtli gives a comprehensive review of the attempts described hitherto for the immobilization of cyclodextrins. However, all of these attempts to prepare materials which are swellable in water resulted in products which either have only a moderate mechanical stability or have a low cyclodextrin content. In some cases, the preparation process is additionally so difficult and expensive that industrial utilization appears to be precluded.

U.S. Pat. No. 3,565,887 relates to unsaturated esters of cyclodextrin. The possibility of polymerization of such compounds is only indicated and the use as column packing material is not mentioned.

FR-A 2,334 691 describes dextran gels. In contrast to cyclodextrin derivatives, compounds of this type lack the capacity for inclusion in a cavity.

EP-A 309,404 relates to copolymers of methacrylate with vinyl- or alkyl-substituted cyclodextrins and their use in pharmaceutical formulations.

In Macromolecules 9, 701 (1976), von A. Harada, M. Furue and S. Nozakura describe the preparation of cyclodextrin acrylates and their free radical polymerization to give soluble polymers. In this process the synthesis of the polymerizable cyclodextrin derivatives was carried out by the Benders method by reaction of β-cyclodextrin with m-nitrophenyl acrylate and subsequent chromatographic purification. Syntheses of this type, which lead to monofunctional cyclodextrin derivatives, are, however, far too expensive for industrial purposes. Furthermore, only soluble products are described on polymerization thereof.

The object of the invention was to develop water-insoluble cyclodextrin polymers which are simple to prepare and which, with a high cyclodextrin content, at the same time possess improved mechanical properties compared with comparable polymers already known. The novel water insoluble polymers should also by hydrophilic and thus swellable in water. In this context, the term "water-insoluble" is to be understood to mean that, at room temperature, that is to say about 20° C., the polymers are soluble in water to the extent of less than 0.1% by weight.

The invention relates to water-insoluble homopolymers or copolymers of methacrylate- or glyceryl methacrylate-substituted cyclodextrins, with the exception of homopolymers of methacrylate-substituted cyclodextrins, or hydroxyalkylcyclodextrins, containing $C_2$ to $C_4$ hydroxyalkyl units, in particular hydroxypropylcyclodextrins, the AS value of which is in each case between 0.3 and 0.9, and also copolymers of the abovementioned substituted cyclodextrins with water-soluble ethylenically unsaturated comonomers, from the group comprising acrylamide, 1-vinyl-2-pyrrolidone, hydroxyethyl acrylate and hydroxyethyl methacrylate. The above-noted exception refers only to homopolymers of methacrylate substituted cyclodextrins.

In a particularly preferred embodiment, the cyclodextrin content in the said polymers is more than 30% by weight, preferably more than 40% by weight, based on the total polymer.

Suitable starting materials for the preparation of the methacrylate-substituted cyclodextrins or hydroxyalkyl cyclodextrins are α-, β- or γ-cyclodextrin and hydroxyalkylcyclodextrins containing $C_2$ to $C_4$ hydroxyalkyl units, in particular hydroxyethyl- and hydroxypropylcyclodextrins of α-, β- and γ-cyclodextrin. These are obtained in a known manner by reaction of the corresponding cyclodextrin with an alkylene oxide, in particular with ethylene oxide or propylene oxide, in a basic, aqueous medium. The product mixtures thus formed, consisting of a multiplicity of cyclodextrin units having different substituents, are usually characterized with the aid of an MS value (degree of molar substitution). The MS value indicates how many alkylene oxide molecules are bonded on average per anhydroglucose unit of a cyclodextrin molecule. Since in the case of the reaction of the cyclodextrins with alkylene oxides in each case new OH groups are produced in the substituent, which groups are, in turn, able to react with alkylene oxide molecules, in principle MS values higher than 3 are also possible. The MS value can be determined with the aid of $^1$H NMR spectroscopy by simple comparison of the corresponding signal areas of cyclodextrin signals and substituent signals. Hydroxyalkylcyclodextrins having MS values of 0.5–1.0 are particularly suitable for the bead polymers according to the invention.

Cyclodextrin derivatives suitable for free radical polymerization are obtained by reaction of cyclodextrins (α, β or γ) and hydroxyalkylcyclodextrins with methacrylic anhydride in excess in basic organic solvents at temperatures of 60°–100° C. Suitable solvents are polar aprotic organic solvents, for example N,N-dimethylformamide, dimethyl sulfoxide or pyridine. Bases which can be used are amines, such as, for example, triethylamine or pyridine. The cyclodextrin methacrylates or hydroxyalkylcyclodextrin methacrylates formed during the reaction can be isolated by simple precipitation with liquid hydrocarbons, such as, for example, toluene, and subsequent filtration. Only simple washing with an aromatic hydrocarbon, such as, for example, toluene and n-propanol, is necessary as purification operation. The resulting cyclodextrin methacrylates and hydroxyalkylcyclodextrin methacrylates have a purity which is sufficient for free radical polymerization.

The cyclodextrin esters formed during the reaction with methacrylic anhydride also consist of molecules which are not of uniform structure but consist of a multiplicity of cyclodextrin units having different substituents. These substance mixtures, which are outstandingly suitable for a polymerization, are characterized with the aid of an AS value (average degree of substitution). The AS value (determination analogous to the MS value by means of $^1$H NMR spectroscopy) indicates how many methacrylate groups are present on average per anhydroglucose unit of a cyclodextrin molecule. In principle, cyclodextrin methacrylates having AS values of 0 to 3 can be prepared by the methods described. Since, however, readily water-soluble substances are required for the subsequent polymerization to give hydrophilic insoluble bead polymers, only cyclodextrin methacrylates having AS values of between 0.3 and 0.9 are suitable. Both products having a lower degree of substitution and those having a higher degree of substitution in respect of the methacrylate groups have a solubility in water which is too low for inverse suspension bead polymerization. In addition, at least, on average, two methacrylate groups per cyclodextrin unit are required for the preparation of crosslinked, insoluble polymers. Cyclodextrin methacrylates and hydroxyalkylcyclodextrin methacrylates having an average degree of methacrylate substitution of 0.4 to 0.5 are most suitable for crosslinking. Such products all have a solubility in water of more than 25% (w/v) and, in addition, on average at least two polymerizable groups per cyclodextrin unit.

In addition to the methods described above, fixing of methacrylate groups to cyclodextrin units can also be achieved by reaction of cyclodextrins or hydroxyalkylcyclodextrins with compounds of type A, the compounds of type A being used in excess. In this context, the reaction with glycidyl methacrylate (compound of type A where n=1) is particularly suitable.

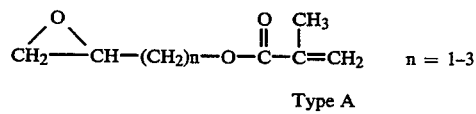

Type A

The base-catalysed reaction is preferably carried out in N,N-dimethylformamide at temperatures of 60°–100° C. The catalyst used can be, for example, 1,8-diazabicyclo[5.4.0]undec-7-ene. During the reaction the oxirane ring is opened and compounds of type A are bonded via an ether bond to the cyclodextrin unit. The resulting cyclodextrin glyceryl methacrylates or hydroxyalkylcyclodextrin glyceryl methacrylates (for n=1) can be isolated in adequate purity by simple precipitation with toluene and subsequent washing with toluene and acetone. Characterization of the products is again effected by determining the average degree of substitution (AS) by means of $^1$H NMR spectroscopy (the signal areas of the substituent signals being compared with those of the cyclodextrin signals). Reaction products of cyclodextrins ($\alpha$, $\beta$ and $\gamma$) or hydroxyalkylcyclodextrins, preferably hydroxyethylcyclodextrins or hydroxypropylcyclodextrins (having MS values of 0.5–1.0), with glycidyl methacrylate, where the average degree of substitution for glyceryl methacrylate substituents should be between 0.3 and 0.9, preferably between 0.4 and 0.5, are particularly suitable for a polymerization. Such products have a solubility in water of more than 30% (w/v).

The polymers according to the invention are prepared by inverse, free radical suspension bead polymerization. In this process the above-described cyclodextrin derivatives having an average degree of substitution with polymerizable groups of 0.3–0.9, preferably of 0.4 to 0.5, are subjected to free radical polymerization in aqueous solution. The concentration of the aqueous monomer solution is between 10 and 50% (w/w). The initiators used are preferably water-soluble peroxide compounds, such as, for example, potassium peroxodisulfate. The dispersing agents (outer phase) used can be liquid aromatic or aliphatic hydrocarbons, such as toluene, or n-decane. The ratio of outer (organic) to inner (aqueous) phase can be varied between 1:1 and 5:1. The polymerization can be carried out at any desired temperature and under normal pressure or slightly elevated pressure. In a preferred embodiment, emulsifiers are added in order to obtain bead polymers having a narrow particle size distribution. Suitable emulsifiers are those customary in suspension polymerization, such as, for example, alkyl sulfates and alkylsulfonates having 8 to 18 C atoms, alkyl-substituted or -ethoxylated phosphoric acid esters or cellulose derivatives. These emulsifiers are preferably used in an amount of 0.5 to 5.0% by weight, based on the hydrocarbon phase.

Since on average at least two polymerizable groups per cyclodextrin unit are already present at an AS value of 0.35 (with respect to the methacrylate groups), crosslinked, insoluble products form during the polymerization described above. As a result of the low AS value of less than 0.9, a large number of unsubstituted hydroxyl groups in the cyclodextrin units are still present in the polymer. This leads to a hydrophilic polymer which is swellable in water.

In addition to the homopolymers described above, the invention also relates to copolymers of various cyclodextrin derivatives with water-soluble, ethylenically unsaturated comonomers, such as, for example, hydroxyethyl acrylate, hydroxyethyl methacrylate or 1-vinyl-2-pyrrolidone. They are prepared analogously to the suspension bead polymerization described, it being possible for the ratio of polymerizable cyclodextrin derivative to water-soluble comonomer to reach 10:1 (w/w) to 1:1 (w/w). The bead polymers formed in this process are also exceptionally hydrophilic and swellable in water.

Surprisingly, in the swollen state (in water) the cyclodextrin bead polymers prepared in this way show distinctly better mechanical properties than hydrophilic cyclodextrin polymers readily swellable in water which are already known (same particle size, same water retention capacity, same gel bed volume), for example such as the epichlorohydrin-crosslinked cyclodextrin polymers prepared in accordance with German Patent Specification DE 29 27 733.

The cyclodextrin bead polymers according to the invention are suitable as column packing material for chromatographic separations of dissolved substances, as catalysts or for the selective removal of hydrophobic substances from aqueous solutions.

The following examples serve to illustrate the invention further.

EXAMPLE 1

$\beta$-Cyclodextrin methacrylate 160 g of dry $\beta$-cyclodextrin are suspended under N$_2$ blanketing gas in 400 ml of dry pyridine, some of the cyclodextrin going into solution. The mixture is heated to 60° C. 60 g of methacrylic anhydride are added at this temperature and the reaction mixture is stirred for 3 h at 98° C., virtually all of the cyclodextrin going into solution.

After cooling, the small amount of undissolved solid is filtered off and 1200 ml of toluene are added to the filtrate. After stirring for 1 hour, the solid is filtered off, washed with 300 ml of toluene and 2× with, in each case, 300 ml of n-propanol and dried at 30° C. and a pressure of 50 mbar for 20 hours. 179 g of $\beta$-cyclodextrin methacrylate (AS=0.4) which is readily soluble in water (>30% w/v) are obtained. Yield: 96% based on $\beta$-cyclodextrin.

EXAMPLE 2

$\alpha$-Cyclodextrin methacrylate 75 g of dry $\alpha$-cyclodextrin are dissolved at 60° C. under N$_2$ blanketing gas in 100 ml of dry dimethyl sulfoxide. After adding 28 g of triethylamine and 28.6 g of methacrylic anhydride, the reaction mixture is stirred for 2 hours at 98° C. After cooling to 20° C., 2000 ml of acetone are added to the resulting solution and the mixture is stirred for a further 1 hour. The precipitated $\alpha$-cyclodextrin methacrylate is filtered off, washed 2× with, in each case, 200 ml of acetone and dried at 30° C. and a pressure of 50 mbar for 24 hours. 80.6 g of $\alpha$-cyclodextrin methacrylate (AS=0.4) which is readily soluble in water (>30% w/v) are obtained. Yield: 92% based on $\alpha$-cyclodextrin.

EXAMPLE 3

$\beta$-Cyclodextrin methacrylate 100 g of dry $\beta$-cyclodextrin are dissolved under N$_2$ blanketing gas in 300 ml of dry N,N-dimethylformamide and 37.4 g of triethylamine are added. After heating to 95° C., 38 g of methacrylic anhydride are added rapidly.

The reaction mixture is then stirred for 3.5 hours at 98° C. After the reaction is complete, the resulting solution is cooled to 20° C. and 1500 ml of toluene are added. The precipitated $\beta$-cyclodextrin methacrylate is filtered off, washed once with 300 ml of toluene and twice with, in each case, 300 ml of n-propanol and then dried at 35° C. and a pressure of 50 mbar for 20 hours. 116 g of β-cyclodextrin methacrylate (AS=0.4) which is readily soluble in water (>30% w/v) are obtained. Yield: 99% based on β-cyclodextrin.

EXAMPLE 4

β-Cyclodextrin glyceryl methacrylate 75 g of dry β-cyclodextrin and 0.75 g of 1,8-dicabicyclo[5.4.0]undec-7-ene are dissolved in 187.5 ml of dry N,N-dimethylformamide. 26.3 g of glycidyl methacrylate are added rapidly to this solution. The reaction mixture is then stirred for 2.5 h at 98° C. It is then cooled to 25° C. and a small amount of solid is filtered off. 940 ml of toluene are added to the filtrate. The β-cyclodextrin glyceryl methacrylate which precipitates is filtered off and washed with 150 ml of toluene and then twice with 250 ml of acetone.

After drying for 18 hours at 35° C. and a pressure of 50 mbar, 96 g of β-cyclodextrin glyceryl methacrylate (AS=0.4) which is readily soluble in water (>30% w/v) are obtained.

Yield: 95% based on β-cyclodextrin.

EXAMPLE 5

Hydroxypropyl-β-cyclodextrin glyceryl methacrylate

Hydroxypropyl-β-cyclodextrin glyceryl methacrylate is prepared as described in Example 4, 91 g of hydroxypropyl-β-cyclodextrin (MS=0.6) being employed in place of β-cyclodextrin.

112 g of hydroxypropyl-β-cyclodextrin glyceryl methacrylate ($MS_{hydroxypropyl}=0.6$; $AS_{glyceryl\ methacrylate}=0.4$) which is, readily soluble in water (>30% w/v) are obtained.

Yield: 95% based on hydroxypropyl-β-cyclodextrin (MS=0.6).

EXAMPLE 6

Hydroxypropyl-β-cyclodextrin methacrylate

Hydroxypropyl-β-cyclodextrin methacrylate is prepared as described in Example 3, 132 g of hydroxypropyl-β-cyclodextrin (MS=0.9) being employed in place of β-cyclodextrin.

140 g of hydroxypropyl-β-cyclodextrin methacrylate ($MS_{hydroxypropyl}=0.9$; $AS_{methacrylate}=0.4$) which is readily soluble in water (>30% w/v) are obtained. Yield: 94% based on hydroxypropyl-β-cyclodextrin (MS=0.9).

EXAMPLE 7

γ-Cyclodextrin methacrylate

γ-Cyclodextrin methacrylate is prepared as described in Example 3, 100 g of γ-cyclodextrin being employed in place of β-cyclodextrin. 99 g of γ-cyclodextrin methacrylate (AS=0.4) which is readily soluble in water (>30% w/v) are obtained.

Yield: 85% based on γ-cyclodextrin.

EXAMPLE 8

Polymerization of β-cyclodextrin glyceryl methacrylate 4.05 g of the emulsifier "Gafac RM 510" from GAF (Deutschland) GmbH, 5020 Frechen (complex phosphoric acid ester) are added to 405 ml of n-decane under N₂ blanketing gas in a cylindrical 1 l glass vessel provided with an impeller stirrer and a heating jacket and the mixture is stirred at 70° C. and at a stirrer speed of 750 rpm.

45 g of β-cyclodextrin glyceryl methacrylate (AS=0.4) are dissolved in 90 g of deionized water at 25° C. and 23 g of 5% strength (w/v) aqueous potassium peroxodisulfate solution are added. This solution is poured into the n-decane phase with stirring. The resulting emulsion is stirred for 2.5 h at 75° C. and 750 rpm, a polymer in bead form being formed.

The resulting suspension is cooled to 25° C. and the polymer solid is filtered off and washed with 100 ml of n-decane, 150 ml of ethanol, twice with, in each case, 150 ml of water and finally again with 150 ml of ethanol.

42 g (yield: 93%) of polymer are obtained in the form of uniform beads having an average particle size of 15 μm. In water, the polymer shows a swelling of 1.8 g/g and a gel bed volume of 4.2 ml/g. In order to determine the stability of the resulting cyclodextrin gel to pressure, the flow-through rate of water through a column packed with the gel (packed height: 30 cm; °: 2.5 cm) was measured. The flow-through rate is 35 ml/min under a pressure of 10 bar.

EXAMPLE 9

Polymerization of hydroxypropyl-β-cyclodextrin methacrylate

The polymerization is carried out as described in Example 8, 45 g of hydroxypropyl-β-cyclodextrin methacrylate ($MS_{hydroxypropyl}=0.9$; $AS_{methacrylate}=0.4$) being employed in place of β-cyclodextrin glyceryl methacrylate.

44 g (yield: 98%) of polymer in bead form with an average particle diameter of 30 μm, a swelling of 2.1 g/g and a gel bed volume of 5.2 ml/g are obtained. The flow-through rate is 40 ml/min under a pressure of 10 bar.

EXAMPLE 10

Copolymerization of β-cyclodextrin methacrylate with acrylamide

The polymerization is carried out as described in Example 8, the monomer solution used being a solution of 21 g of acrylamide and 60 g of β-cyclodextrin methacrylate (AS=0.4) in 87 g of deionized water, which solution is used for the polymerization after the addition of 23 g of 5% strength (w/v) potassium peroxodisulfate solution in n-decane as dispersing agent. 74 g (yield: 91%) of polymer in bead form with an average particle diameter of 50 μm and a swelling of 1.8 g/g and a gel bed volume of 5.5 ml/g are obtained. The flow-through rate is 90 ml/min under a pressure of 10 bar.

EXAMPLE 11

Copolymerization of β-cyclodextrin methacrylate with 1-vinyl-2-pyrrolidone

In the apparatus described in Example 8, 405 ml of n-decane and 4.05 g of the emulsifier "Cremophor WO 7" from BASF (hydrogenated castor oil which has additionally been reacted with ethylene oxide) are prepared as outer phase for an inverse suspension polymerization at 75° C. Under a nitrogen atmosphere, a solution of 60 g of β-cyclodextrin methacrylate (AS=0.4) and 16 g of 1-vinyl-2-pyrrolidone in 80 g of deionized water is prepared and 23 g of 5% strength (w/v) aqueous potassium peroxodisulfate solution are added. Immediately thereafter this mixture is emulsified in the n-decane phase. The resulting emulsion is stirred for 2.5 h at 75° C. and 750 rpm, a polymer in bead form being formed. Working up is carried out in accordance with the method described in Example 8.

71 g (yield 93%) of a polymer in bead form which has an average particle diameter of 35 μm, a swelling of 1.9 g/g and a gel bed volume of 5.2 ml/g are obtained. The flow-through rate is 55 ml/min under a pressure of 10 bar.

EXAMPLE 12

Copolymerization of α-cyclodextrin methacrylate with hydroxyethyl methacrylate

In the apparatus described in Example 8, 450 ml of toluene and 4.05 g of the emulsifier "Ethocel 22 cps" from Janssen Chimica (ethylcellulose) are prepared under $N_2$ blanketing gas, at 75° C., as outer phase for an inverse suspension polymerization. A solution of 60 g of α-cyclodextrin methacrylate and 21 g of hydroxyethyl methacrylate in 88 g of deionized water, to which 23 g of 5% strength (w/v) aqueous potassium peroxodisulfate solution have been added, is emulsified in this phase. The resulting emulsion is stirred for 2.5 h at 75° C. and 750 rpm, a polymer in bead form being formed. Working up is carried out in accordance with the method described in Example 8.

72 g (yield: 89%) of polymer in bead form which has an average particle diameter of 50 μm, a swelling of 1.7 g/g and a gel bed volume of 4.8 ml/g are obtained. The flow-through rate is 150 ml/min under a pressure of 10 bar.

EXAMPLE 13

Copolymerization of β-cyclodextrin methacrylate with hydroxyethyl acrylate

The polymerization is carried out as described in Example 8, but the monomer solution used is a solution of 60 g of β-cyclodextrin methacrylate (AS=0.4) and 16 g of hyroxy(sic)ethyl acrylate in 80.5 g of deionized water, to which 23 g of 5% strength (w/v) aqueous potassium peroxodisulfate solution have been added.

83 g (yield: 96.5%) of polymer in bead form which has an average particle diameter of 25 μm, a swelling of 1.6 g/g and a gel bed volume of 4.9 ml/g are obtained. The flow-through rate is 40 ml/min under a pressure of 10 bar.

EXAMPLE 14

Copolymerization of β-cyclodextrin methacrylate with hydroxyethyl methacrylate

The polymerization is carried out as described in Example 8, but the monomer solution used is a solution of 62 g of β-cyclodextrin methacrylate (AS=0.4) and 31 g of hydroxyethyl methacrylate in 70 g of deionized water, to which 23 g of 5% strength (w/v) aqueous potassium peroxodisulfate solution has been added. 88 g (yield: 95%) of polymer in bead form which has an average particle diameter of 75 μm, a swelling of 1.2 g/g and a gel bed volume of 3.7 ml/g are obtained. The flow-through rate is 250 ml/min under a pressure of 10 bar.

EXAMPLE 15

Copolymerization of hydroxypropyl-β-cyclodextrin methacrylate with hydroxyethyl methacrylate The polymerization is carried out as described in Example 8, but the monomer solution used is a solution of 62 g of hydroxypropyl-β-cyclodextrin methacrylate ($MS_{hydroxypropyl}=0.9$; $AS_{methacrylate}=0.4$) and 31 g of hydroxyethyl methacrylate in 70 g of deionized water, to which 23 g of 5% strength (w/v) aqueous potassium peroxodisulfate have been added.

85 g (yield: 91%) of polymer in bead form which has an average particle diameter of 70 μm, a swelling of 1.3 g/g and a gel bed volume of 4.0 ml/g are obtained. The flow-through rate is 190 ml/min under a pressure of 10 bar.

EXAMPLE 16

Copolymerization of β-cyclodextrin glyceryl methacrylate with hydroxyethyl methacrylate The polymerization is carried out as described in Example 8, but the monomer solution used is a solution of 37 g of β-cyclodextrin glyceryl methacrylate (AS=0.4) and 37 g of hydroxyethyl methacrylate in 90 g of deionized water, to which 23 g of 5% strength (w/v) aqueous potassium peroxodisulfate solution have been added.

70 g (yield: 95%) of polymer in gel form which has an average particle diameter of 40 μm, a swelling of 1.2 g/g and a gel bed volume of 3.8 ml/g are obtained. The flow-through rate is 200 ml/min under a pressure of 10 bar.

EXAMPLE 17

Copolymerization of β-cyclodextrin glyceryl methacrylate with hydroxyethyl acrylate The polymerization is carried out as described in Example 17, but the monomer solution used is a solution of 45 g of β-cyclodextrin glyceryl methacrylate (AS=0.4) and 45 g of hydroxyethyl acrylate in 90 g of deionized water, to which 23 g of 5% strength (w/v) aqueous potassium peroxodisulfate solution have been added.

83 g (yield: 92%) of polymer in bead form which has an average particle diameter of 40 μm, a swelling of 2.0 g/g and a gel bed volume of 6.0 ml/g are obtained. The flow-through rate is 40 ml/min under a pressure of 10 bar.

EXAMPLE 18

Copolymerization of β-cyclodextrin methacrylate with β-cyclodextrin glyceryl methacrylate The polymerization is carried out as described in Example 17, but the monomer solution used is 40 g of β-cyclodextrin methacrylate (AS=0.4) and 20 g of β-cyclodextrin glyceryl methacrylate (AS=0.4) in 90 g of deionized water, to which 23 g of 5% strength (w/v) aqueous potassium peroxodisulfate solution have been added.

53 g (yield: 89%) of a polymer in bead form which has an average particle diameter of 50 μm, a swelling of 1.3 g/g and a gel bed volume of 3.4 ml/g are obtained. The flow-through rate is 30 ml/min under a pressure of 10 bar.

EXAMPLE 19

Polymer composed of β-cyclodextrin methacrylate, β-cyclodextrin glyceryl methacrylate and 1-vinyl-2-pyrrolidone The polymerization is carried out as described in Example 17, but the monomer solution used is a solution of 36 g of β-cyclodextrin methacrylate (AS=0.4), 36 g of β-cyclodextrin glyceryl methacrylate and 18 g of 1-vinyl-2-pyrrolidone in 90 g of deionized water, to which 23 g of 5% strength (w/v) aqueous potassium peroxodisulfate solution have been added.

83 g (yield: 92%) of a polymer in bead form which has an average particle diameter of 50 μm, a swelling of 1.9 g/g and a gel bed volume of 4.0 ml/g are obtained. The flow-through rate is 80 ml/min under a pressure of 10 bar.

EXAMPLE 20

Polymer composed of β-cyclodextrin methacrylate, β-cyclodextrin glyceryl methacrylate and hydroxyethyl methacrylate The polymerization is carried out as described in Example 15, but the monomer solution used is a solution of 22.5 g of β-cyclodextrin methacrylate (AS=0.4), 22.5 g of β-cyclodextrin glyceryl methacrylate (AS=0.4) and 45 g of hydroxyethyl methacrylate in 90 g of deionized water, to which 23 g of 5% strength (w/v) potassium peroxodisulfate solution have been added.

83 g (yield: 92%) of a polymer in bead form which has an average particle diameter of 50 μm, a swelling of 1.2 g/g and a gel bed volume of 4.9 ml/g are obtained. The flow-through rate is 150 ml/min under a pressure of 10 bar.

To determine the mechanical properties, the flow rate of water through a column packed with cyclodextrin polymer was measured as a function of the pressure. The diameter of the column was 2.5 cm and the packed height of the cyclodextrin polymer pre-swollen in water was 30 cm.

In these pressure tests it was found that, for example, the cyclodextrin polymers described by J. Szejtli in DE 29 27 733, which already had improved mechanical properties compared with previously known similar polymers, already have their maximum flow-through rate at a pressure of less than 3 bar. There is no further increase in this flow-through rate with further increasing pressure. The cyclodextrin polymers according to the invention, on the other hand, show a continuous rise in the flow-through rate with increasing pressure up to at least 10 bar. Under a pressure of 10 bar, the absolute flow-through rates are, moreover, distinctly higher than in the case of the polymer prepared in accordance with DE 29 27 733. In these tests, bead polymers of the same diameter, and also the same water retention capacity (swelling) and gel bed volume, were always compared with one another.

FIG. 1

Flow-through rate for an epichlorohydrin-crosslinked β-cyclodextrin polymer prepared in accordance with DE 29 27 733 (swelling 1.5 g/g; gel bed volume 3.2 ml/g; average particle size 150 μm)

FIG. 2

Flow-through rate for the copolymer according to Example 14 (swelling 1.2 g/g; gel bed volume 3.7 ml/g; average particle size 75 μm)

We claim:

1. A water-insoluble hydrophilic cyclodextrin polymer selected from the group consisting of
   with the exception of a homopolymer of methacrylate cyclodextrin;
   a copolymer of a methacrylate substituted cyclodextrin;
   a homopolymer of glyceryl methacrylate substituted cyclodextrin;
   a copolymer of glyceryl methacrylate substituted cyclodextrins;
   a homopolymer of methacrylate hydroxyalkyl cyclodextrin containing $C_2$ to $C_4$ hydroxyalkyl units;
   a copolymer of methacrylate hydroxyalkyl cyclodextrin containing $C_2$ to $C_4$ hydroxyalkyl units;
   a homopolymer of glyceryl methacrylate hydroxyalkyl cyclodextrin containing $C_2$ to $C_4$ hydroxyalkyl units;
   a copolymer of glyceryl methacrylate hydroxyalkyl cyclodextrin containing $C_2$ to $C_4$ hydroxyalkyl units;
   each of said above-noted methacrylate containing polymers having an AS value between 0.3 and 0.9; and
   a copolymer of the said substituted cyclodextrin derivatives with a water-soluble ethylenically unsaturated comonomer selected from the group consisting of acrylamide, 1-vinyl-2-pyrrolidone, hydroxyethyl acrylate and hydroxyethyl methacrylate.

2. The cyclodextrin polymer as claimed in claim 1, wherein the cyclodextrin content is more than 30% by weight, based on the total polymer weight.

3. A process for the preparation of a water-insoluble hydrophilic cyclodextrin polymer consisting essentially of the steps of
   providing monomers capable of preparing said cyclodextrin polymer selected from the group consisting of
   with the exception of a homopolymer of methacrylate cyclodextrin;
   a copolymer of a methacrylate substituted cyclodextrin;
   a homopolymer of glyceryl methacrylate substituted cyclodextrin;
   a copolymer of glyceryl methacrylate substituted cyclodextrins;
   a homopolymer of methacrylate hydroxyalkyl cyclodextrin containing $C_2$ to $C_4$ hydroxyalkyl units;
   a copolymer of methacrylate hydroxyalkyl cyclodextrin containing $C_2$ to $C_4$ hydroxyalkyl units;
   a homopolymer of glyceryl methacrylate hydroxyalkyl cyclodextrin containing $C_2$ to $C_4$ hydroxyalkyl units;
   a copolymer of glyceryl methacrylate hydroxyalkyl cyclodextrin containing $C_2$ to $C_4$ hydroxyalkyl units;
   each of said above-noted methacrylate containing polymers having an AS value between 0.3 and 0.9;
   a copolymer of the said substituted cyclodextrin derivatives with a water-soluble ethylenically unsaturated comonomer selected from the group consisting of acrylamide, 1-vinyl-2-pyrrolidone, hydroxyethyl acrylate and hydroxyethyl methacrylate;
   polymerizing said monomers by free radical suspension polymerization under normal pressure in a two-phase medium comprising an aqueous phase and an organic hydrocarbon phase in a weight ratio of 1:1 to 1:5; and
   using a monomer concentration in the aqueous phase of 10% to 50% by weight, based on the total weight of the aqueous phase.

4. The process as claimed in claim 3, comprising carrying out said polymerization in the presence of water-soluble ethylenically unsaturated comonomers, with the ratio of cyclodextrin or hydroxyalkylcyclodextrin derivatives or the mixtures thereof to said water-soluble comonomer being from 10:1 (w/w) to 1:1 (w/w).

* * * * *